(12) United States Patent
Wenzel et al.

(10) Patent No.: US 10,373,375 B2
(45) Date of Patent: Aug. 6, 2019

(54) IMAGE PROCESSING SYSTEM AND METHOD USING DEVICE ROTATION

(75) Inventors: Fabian Wenzel, Hamburg (DE); Roel Truyen, Turnhout (BE); Jean-Pierre Franciscus Alexander Maria Ermes, Eindhoven (NL); Johan Michiel Den Harder, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 764 days.

(21) Appl. No.: 14/007,698

(22) PCT Filed: Mar. 30, 2012

(86) PCT No.: PCT/IB2012/051536
§ 371 (c)(1),
(2), (4) Date: Sep. 26, 2013

(87) PCT Pub. No.: WO2012/137113
PCT Pub. Date: Oct. 11, 2012

(65) Prior Publication Data
US 2014/0022242 A1  Jan. 23, 2014

(30) Foreign Application Priority Data
Apr. 8, 2011 (EP) .................................... 11161606

(51) Int. Cl.
*G06T 19/00* (2011.01)
*G06T 15/20* (2011.01)
(Continued)

(52) U.S. Cl.
CPC .......... *G06T 19/003* (2013.01); *G06F 1/1694* (2013.01); *G06F 3/04815* (2013.01);
(Continued)

(58) Field of Classification Search
CPC ......... G06T 13/00–60; G06T 15/00–87; G06T 17/00–30; G06T 19/00–20;
(Continued)

(56) References Cited

U.S. PATENT DOCUMENTS 5,557,714 A * 9/1996 Lines .................. G06F 3/04845
345/653
7,113,186 B2  9/2006 Kim
(Continued)

FOREIGN PATENT DOCUMENTS

CN    101196795 A   6/2008
EP    1884864 A1    2/2008
(Continued)

OTHER PUBLICATIONS

Watt, Alan "3D Computer Graphics", 3rd Ed., Pub 2000, Addison-Wesley Publishing Ltd., ISBN: 0-201-39855-9, pp. 2-8. (Year: 2000).*
(Continued)

*Primary Examiner* — Daniel F Hajnik

(57) ABSTRACT

Image processing system 100 for enabling a user to navigate through image data having at least three spatial dimensions by displaying views 155 of the image data, the image processing system comprising an image device 110 comprising a display 130 for displaying the views of the image data and an orientation sensor 120 for measuring an orientation of the image device with respect to a reference orientation for providing rotation data 125 indicative of a device rotation of the image device, means 140 for establishing a center of rotation in the image data, and an image processor 150 for establishing the views of the image data in relation to the device rotation by, for establishing a current view, (i) receiving the rotation data from the orientation sensor, (ii) establishing a view rotation in relation to the device rotation, and (iii) establishing the current view in
(Continued)

dependence on the view rotation around the center of rotation with respect to a reference view.

18 Claims, 5 Drawing Sheets

(51) Int. Cl.
*G06F 1/16* (2006.01)
*G06F 3/0481* (2013.01)
*H04N 13/388* (2018.01)
*H04N 13/398* (2018.01)

(52) U.S. Cl.
CPC ........... *G06T 15/20* (2013.01); *H04N 13/398* (2018.05); *G06F 2200/1637* (2013.01); *G06F 2203/04806* (2013.01); *H04N 13/388* (2018.05)

(58) Field of Classification Search
CPC ..... G06F 2200/1614; G06F 2200/1637; G06F 3/04815; G06F 3/0346; G06F 2200/163; A61B 6/466; A61B 19/50; A61B 2019/501–508; A61B 2019/5295–5297; A63F 13/525–5258; A63F 2300/6661–6684
See application file for complete search history.

(56) References Cited

U.S. PATENT DOCUMENTS

| | | | | |
|---|---|---|---|---|
| 2004/0037459 | A1* | 2/2004 | Dodge | G06T 17/00 382/154 |
| 2005/0068317 | A1* | 3/2005 | Amakai | G06T 7/001 345/419 |
| 2005/0119550 | A1* | 6/2005 | Serra | G06T 19/00 600/407 |
| 2006/0017748 | A1* | 1/2006 | Ozawa | A61B 5/055 345/654 |
| 2006/0122539 | A1* | 6/2006 | Lee et al. | 600/587 |
| 2007/0103464 | A1* | 5/2007 | Kaufman | G06T 7/0012 345/424 |
| 2007/0206030 | A1* | 9/2007 | Lukis | G06T 19/20 345/653 |
| 2007/0279435 | A1 | 12/2007 | Ng | |
| 2009/0156935 | A1 | 6/2009 | Frisa et al. | |
| 2010/0053322 | A1 | 3/2010 | Marti | |
| 2010/0125816 | A1* | 5/2010 | Bezos | 715/863 |
| 2010/0171691 | A1* | 7/2010 | Cook | G06F 1/1613 345/156 |
| 2010/0174421 | A1 | 7/2010 | Tsai | |
| 2010/0188503 | A1* | 7/2010 | Tsai | G01C 21/20 348/142 |
| 2011/0041098 | A1 | 2/2011 | Kajiya | |
| 2011/0145718 | A1* | 6/2011 | Ketola | G06F 3/0346 715/739 |
| 2011/0248987 | A1* | 10/2011 | Mitchell | 345/419 |
| 2012/0215096 | A1* | 8/2012 | Gilboa | G09B 23/28 600/424 |

FOREIGN PATENT DOCUMENTS

| | | |
|---|---|---|
| EP | 2259163 A2 | 12/2010 |
| JP | H0981786 A | 3/1997 |
| JP | 2002351309 A | 12/2002 |
| JP | 2003319157 A | 11/2003 |
| JP | 2005107972 A | 4/2005 |
| JP | 2006146440 A | 6/2006 |
| JP | 2007044508 A | 2/2007 |
| JP | 2010026064 A | 2/2010 |
| RU | 2372844 C1 | 11/2009 |
| WO | 0124116 A1 | 4/2001 |
| WO | 2006038180 A1 | 4/2006 |

OTHER PUBLICATIONS

Raman, Bhargav et al "Radiology on Handheld Devices: Image Display, Manipulation, and PACS Integration Issues", Radiographics, vol. 24, No. 1, 2004, pp. 299-310.

Ericson, Finn "Interactive Handheld Phantograms", Thesis in Computer Science 2010.

* cited by examiner

IMAGE PROCESSING SYSTEM AND METHOD USING DEVICE ROTATION

CROSS-REFERENCE TO PRIOR APPLICATIONS

This application is the U.S. National Phase application under 35 U.S.C. § 371 of International Application No. PCT/IB2012/051536, filed on Mar. 30, 2012, which claims the benefit of European Patent Application No. 11161606.6, filed on Apr. 8, 2011, These applications are hereby incorporated by reference herein.

FIELD OF THE INVENTION

The invention relates to an image processing system for, and a method of, enabling a user to navigate through image data having at least three spatial dimensions by displaying views of the image data on a display of an image device.

The invention further relates to a handheld device, workstation and imaging apparatus comprising the image processing system, and a computer program product comprising instructions for causing a processor system to perform the method.

In the fields of image viewing and image display, various image processing systems and methods exist that enable users to navigate through image data having at least three spatial dimensions. For example, a workstation may enable a radiologist to navigate through a three-dimensional human structure. For that purpose, the radiologist may provide navigation commands to the workstation using, e.g., a mouse, a keyboard or a touch screen input, and in response, the workstation may show views of the human structure on a display in accordance with the navigation commands.

BACKGROUND OF THE INVENTION

It is known from US 2010/0174421 that a mobile computing device may be equipped with a display and an orientation sensor for enabling the orientation of the mobile computing device to be used for navigating through image data on the display.

More specifically, US 2010/0174421 describes a mobile user interface that is suitable for mobile computing devices and which uses a device position/orientation in real space to select a portion of content that is displayed. The content may be a three-dimensional image file. The content is presumed fixed in virtual space with the mobile user interface displaying a portion of the content as if viewed through a camera. Data from motion, distance or position sensors are used to determine the relative position/orientation of the device with respect to the content to select a portion of the content for display.

SUMMARY OF THE INVENTION

A problem of the aforementioned mobile user interface is that it does not allow a user to obtain a desired view of the image data in a sufficiently convenient manner.

It would be advantageous to have an image processing system or method for enabling a user to more conveniently obtain a desired view of the image data.

To better address this concern, a first aspect of the invention provides an image processing system for enabling a user to navigate through image data having at least three spatial dimensions by displaying views of the image data, the image processing system comprising an image device comprising a display for displaying the views of the image data and an orientation sensor for measuring an orientation of the image device with respect to a reference orientation for providing rotation data indicative of a device rotation of the image device, means for establishing a center of rotation in the image data, and an image processor for establishing the views of the image data in relation to the device rotation by, for establishing a current view, (i) receiving the rotation data from the orientation sensor, (ii) establishing a view rotation in relation to the device rotation, and (iii) establishing the current view in dependence on the view rotation around the center of rotation with respect to a reference view.

In a further aspect of the invention, a handheld device is provided comprising the image processing system set forth. In a further aspect of the invention, a workstation or imaging apparatus is provided comprising the image processing system set forth.

In a further aspect of the invention, a method is provided of enabling a user to navigate through image data having at least three spatial dimensions by displaying views of the image data on a display of an image device, the method comprising measuring an orientation of the image device with respect to a reference orientation for providing rotation data indicative of a device rotation of the image device, establishing a center of rotation in the image data, and establishing the views of the image data in relation to the device rotation by, for establishing a current view, (i) receiving the rotation data from the orientation sensor, (ii) establishing a view rotation in relation to the device rotation, and (iii) establishing the current view in dependence on the view rotation around the center of rotation with respect to a reference view.

In a further aspect of the invention, a computer program product is provided comprising instructions for causing a processor system to perform the method set forth.

The aforementioned measures enable a user to navigate through image data having at least three spatial dimensions. For that purpose, an image device is provided comprising a display that displays views of the image data. A view is a representation of at least a part of the image data. By showing views corresponding to different parts of the image data, the user may navigate through the image data. The image device comprises the display, i.e., the display is part of the image device. The image device further comprises an orientation sensor, e.g., an accelerometer, compass, etc. The orientation sensor is used to measure an orientation of the image device with respect to a reference orientation, e.g., a previous orientation. Since the display is part of the image device, the orientation of the image device inherently coupled to the orientation of the display. By comparing the orientation of the image device to the reference orientation, the orientation sensor can determine a rotation of the image device and thus of the display, i.e., a device rotation. The orientation sensor is arranged for providing the device rotation in the form of rotation data.

The image processing system further comprises means for establishing a center of rotation in the image data. The center of rotation is defined in the at least three spatial dimensions of the image data. Thus, said means establishes the center of rotation in the at least three spatial dimensions, e.g., in the form of a three-dimensional vector or coordinate when the center of rotation is a point, or in the form of a two-dimensional vector or coordinate when the center of rotation is formed by a rotation axis.

The image processing system further comprises an image processor for establishing the views of the image data in relation to the device rotation. For that purpose, the image processor receives the rotation data from the orientation sensor. This allows the image processor to establish a view rotation as a function of the device rotation. The view rotation is then used to establish a view that is rotated around the center of rotation with respect to a reference view, with the amount of rotation being specified by the view rotation. Consequently, the device rotation is used to establish a view rotation, and the view rotation is used to establish the new view that is rotated around the center of rotation in the image data.

The invention is partially based on the recognition that obtaining a desired view of the image data may be inconvenient with an image processing system. A reason for this is that the user may need to combine various navigation commands, such as rotate, pan and zoom, in order to obtain a desired view of, e.g., a point or region in the image data. In particular, the user may desire to rotate around the region to obtain a desired view or views of the region, i.e., showing the region from various sides. For obtaining such a rotation around the region, the user may need to perform various navigation commands sequentially, e.g., sequentially rotate the view, pan the view, rotate the view, pan the view, etc. Disadvantageously, such navigation is inconvenient and complicated to the user.

The aforementioned measures have the effect that a means is provided for establishing a center of rotation in the image data, and that the image processor is configured for establishing the current view by rotating around the center of rotation. Moreover, the user can influence the amount of rotation, i.e., the view rotation, as the view rotation is established by the image processor in relation to the device rotation. Thus, the image processing system enables a user to rotate around a region of interest in the image data by rotating the image device and thus not needing to, e.g., pan or otherwise provide navigation commands to the image processing system. Advantageously, there is no need to sequentially rotate the view, pan the view, rotate the view, etc., for showing the region from various sides.

Optionally, the means for establishing the center of rotation is arranged for detecting a region of interest in the image data, and establishing the center of rotation in dependence on the region of interest.

The means for establishing the center of rotation comprises the functionality of a region of interest detector by automatically detecting a region of interest in the image data. By establishing the center of rotation in dependence on the region of interest, the region of interest is used in determining the center of rotation. Advantageously, a region of interest may be automatically detected and used as center of rotation without a need for the user to manual select the region of interest as the center of rotation in the image data.

Optionally, the image processing system further comprises a user input for receiving selection data from the user, and the means for establishing the center of rotation is arranged for establishing the center of rotation in dependence on the selection data.

By receiving selection data from the user and establishing the center of rotation in dependence on the selection data, input from the user is used in determining the center of rotation. Advantageously, a user may manually select a region of interest as the center of rotation in the image data. Advantageously, a user may influence an automatic selection of the center of rotation, e.g., as obtained from a region of interest detector.

Optionally, the user input is arranged for receiving navigation data from the user, and the image processor is arranged for establishing the views of the image data in dependence on the navigation data.

By receiving navigation data from the user and establishing the views of the image data in dependence on the navigation data, input from the user is used in establishing the views of the image data. Advantageously, the user may navigate through the image data by providing navigation data in addition to rotating the image device.

Optionally, the navigation data comprises a pan and/or a zoom navigation command. Thus, the user may navigate through the image data using rotation, panning and/or zooming, with the rotation being established by the user rotating the image device and the pan and/or zoom navigation commands being provided by the user in the form of navigation data. Advantageously, the user may provide the pan and/or zoom navigation commands using, e.g., a mouse, keyboard or touch screen to separate the manner in which the user establishes the panning and/or zooming from the rotation, thus preventing inaccuracies or confusion of the user when navigating through the image data.

Optionally, the image data comprises volumetric image data and the image processor is arranged for said establishing the current view by using at least one of the group of: multi-planar reformatting, volume rendering, and surface rendering, to generate the current view.

By establishing views within volumetric image data using any of the aforementioned techniques, the image processing system is configured for enabling a user to navigate through volumetric image data. Therefore, a user may use the image device to rotate around a center of rotation, e.g., a region of interest, in volumetric image data with the views being generated by any of the using the aforementioned techniques.

Optionally, the image data comprises three-dimensional graphics data and the image processor is arranged for said establishing the current view by using graphics rendering to generate the current view.

Optionally, said establishing the current view comprises (i) establishing a 4×4 transformation matrix in dependence on the view rotation and the center of rotation, and (ii) generating the current view using the 4×4 transformation matrix.

A 4×4 transformation matrix is a particularly efficient way of enabling said establishing the current view in dependence on the view rotation around the center of rotation with respect to a reference view.

Optionally, the image processor is arranged for establishing the view rotation in relation to the device rotation by providing as the view rotation the device rotation.

The view rotation therefore equals the device rotation. Advantageously, a rotation of the image device is translated into a same rotation of the current view, thereby providing the user an intuitive experience of rotating around the center of rotation.

Optionally, the image processor is arranged for establishing the view rotation in relation to the device rotation by applying at least one of the group of: a direct mapping, a gain, an offset, a threshold and a non-linear function, to the device rotation to obtain the view rotation.

The view rotation is obtained by applying a function to the device rotation. Advantageously, a gain may be applied to the device rotation, such that a small device rotation results in a relatively large view rotation, thereby enabling the user to obtain, e.g., a 360 degree view rotation with only, e.g., 90 degrees of device rotation. Advantageously, a non-linear function may be used that optimizes the experience of the user rotating the image device for rotating the current view around the center of rotation in the image data.

Optionally, the image processing system is arranged for receiving a reset command from the user for resetting the reference orientation and/or the reference view.

The user may reset the reference orientation so that the orientation of the device is measured with respect to the new reference orientation. Also, the user may reset the reference view so that any subsequent view rotation is applied to the new reference view. Advantageously, the user may reset the reference orientation to a convenient orientation of the image device, e.g., the current orientation. Advantageously, the user may reset the reference view to a desired view of the image data, e.g., a default view.

Optionally, the image processing system is arranged for receiving a pause command from the user for pausing said establishing the views of the image data in relation to the device rotation.

By providing the pause command, the user may instruct the image processor to temporarily suspend said establishing the views of the image data in relation to the device rotation. Advantageously, when a user needs to temporarily rotate the image device for another reason than navigating through the image data, he may pause said establishing the views of the image data in relation to the device rotation using the pause command.

Optionally, the image device comprises the means for establishing the center of rotation and the image processor. Advantageously, the functionality of the image processing system may be entirely integrated into the image device.

It will be appreciated by those skilled in the art that two or more of the above-mentioned embodiments, implementations, and/or aspects of the invention may be combined in any way deemed useful.

Modifications and variations of the image processing system, the image device, the handheld device, the workstation, the imaging apparatus, the method, and/or the computer program product, which correspond to the described modifications and variations of the image processing system, can be carried out by a person skilled in the art on the basis of the present description.

A person skilled in the art will appreciate that the method may be applied to multi-dimensional image data, e.g. to three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). A dimension of the multi-dimensional image data may relate to time. For example, three-dimensional image data may comprise a time domain series of two-dimensional image data.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
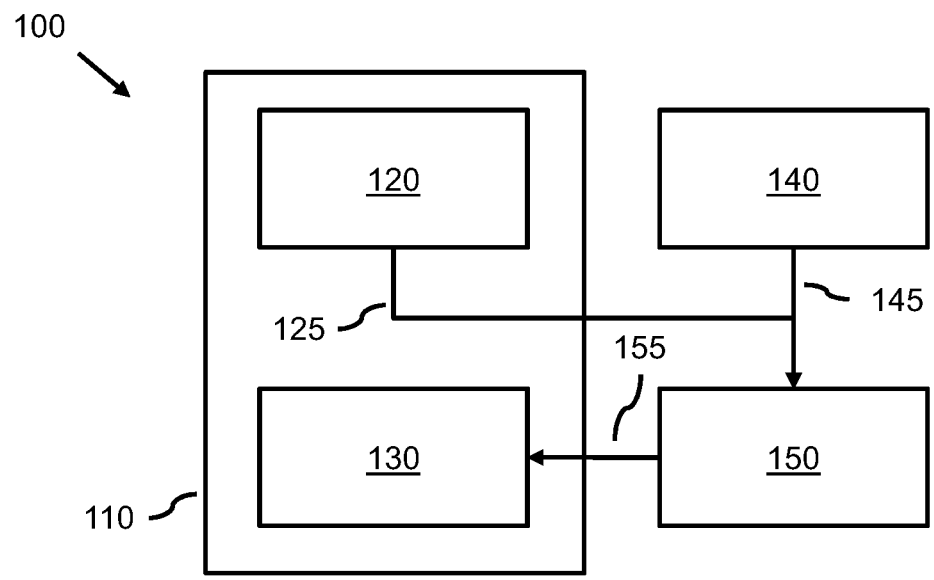
FIG. 1 shows an image processing system according to the present invention.

FIG. 1 shows an image processing system 100 for enabling a user to navigate through image data having at least three spatial dimensions by displaying views 155 of the image data. The image processing system 100 comprises an image device 110 comprising a display 130 for displaying the views 155 of the image data and an orientation sensor 120 for measuring an orientation of the image device 110 with respect to a reference orientation. As a result of the measuring, the orientation sensor 120 provides rotation data 125 that is indicative of a device rotation of the image device 110. The image processing system 100 further comprises means 140 for establishing a center of rotation in the image data. In addition, the image processing system 100 comprises an image processor 150 for establishing the views 155 in relation to the device rotation. The image processor 150 receives the rotation data 125 from the orientation sensor 120 and the center of rotation, in the form of center of rotation data 145, from the means 140 for establishing the center of rotation. The image processor 150 then establishes a current view by establishing a view rotation in relation to the device rotation, and by establishing the current view in dependence on the view rotation around the center of rotation with respect to a reference view.

It will be appreciated that, by generating a current view for a current moment in time and subsequently generating future views at future moments in time, the image processor establishes the views enabling the user to navigate through the image data.

Figure 2:
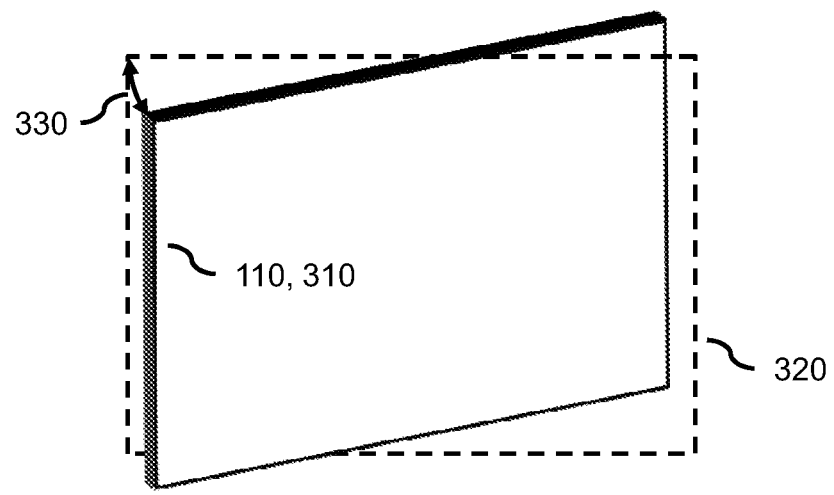
FIG. 2 shows an orientation of the image device, a reference orientation and a device rotation of the image device.

FIGS. 2-7 illustrate an operation of the image processing system 100. In FIG. 2, the orientation 310 of the image device 110 is shown next to a reference orientation 320. The orientation 310 is measured by the orientation sensor 120 with respect to the reference orientation 320. The difference between both orientations provides the device rotation 330.

Figure 3:
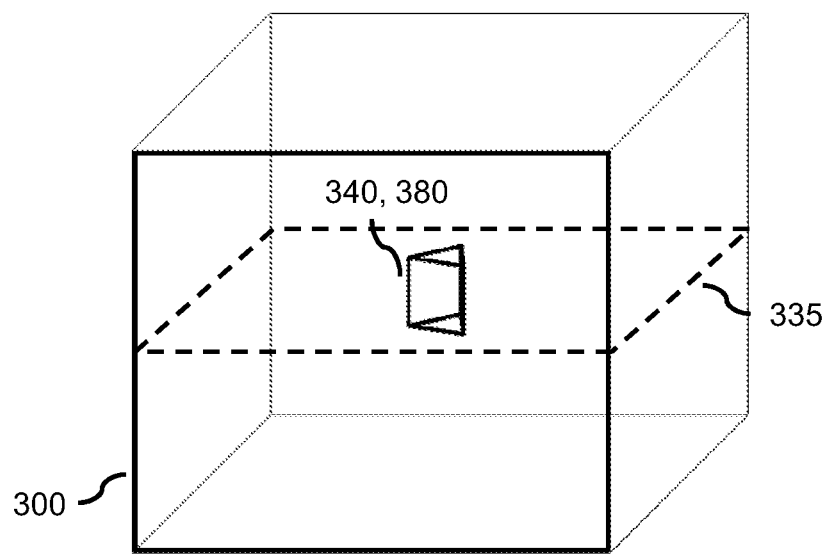
FIG. 3 shows a region of interest in three-dimensional image data.
Figure 4:
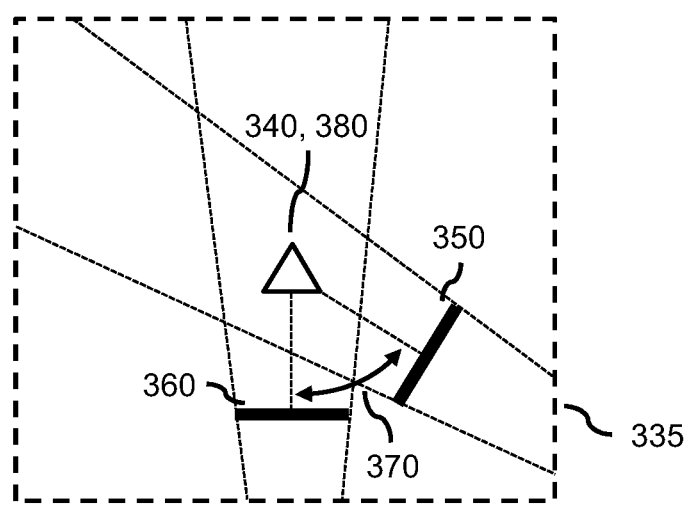
FIG. 4 shows a current view being rotated around a region of interest with respect to a reference view.

FIG. 3 shows, for sake of explanation, the image data 300 as a three-dimensional transparent volume comprising a region of interest 380. It is assumed in the following that the image data 300 is volumetric image data, i.e., being made up of volumetric pixels or voxels. However, it will be appreciated that the image data 300 may equally be of any other known type, such as graphics data comprising so-termed polygons and vertices. FIG. 3 also shows an intersection plane 335 through the image data 300. The intersection plane 335 indicates the intersection of the image data 300 that is depicted in FIG. 4. It is noted, however, that the intersection plane 355 is only used for the sake of explanation, and does not relate to a functioning or use in the image processing system 100.

FIG. 4 shows the aforementioned intersection 355 of the image data 300, with the intersection 355 comprising the region of interest 380. Also shown is a reference view 360. In this example, the reference view 360 is understood as a volume rendering of the image data 300 towards the region of interest 380. Here, the outermost dashed lines that slope outwards from the reference view 360 towards the region of interest 380 indicate a field of view of the reference view, i.e., indicate the part of the image data 300 used in rendering the reference view. More specifically, the outermost dashed lines correspond to a path of rays which are used during the volume rendering as they travel from a virtual camera (not shown in FIG. 4 but located at a point where both lines intersect) through the reference view 360 and further into the image data 300. It will be appreciated that the technique of volume rendering is known from the technical field of volumetric image visualization, e.g., from the publication "*OpenGL® Volumizer Programmer's Guide*", available from the internet address "http://techpubs.sgi.com/library/manuals/3000/007-3720-002/pdf/007-3720-002.pdf".

Figure 5:
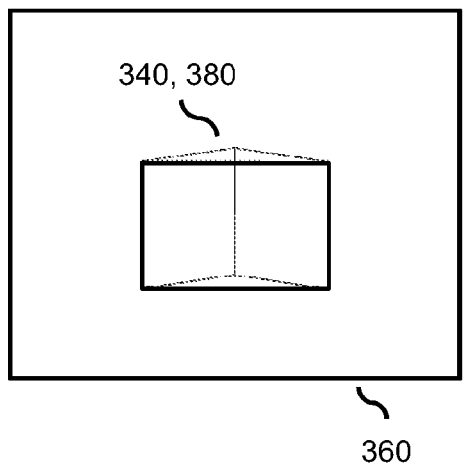
FIG. 5 shows the reference view showing the region of interest.

FIG. 5 shows a result of the volume rendering, i.e., the reference view 360 showing the region of interest 380 from a first side. The image processing system 100 may be configured for displaying the reference view 360 when the orientation 310 of the image device 110 coincides with the reference orientation 320. The reference view 360 may be a default view within the image data, e.g., a default view shown at the start of the operation of the image processing system 100. Similarly, the reference orientation 320 may coincide with an orientation of the image device 110 at the start of said operation.

When a user rotates the image device 110, i.e., changes its orientation 310 with respect to the reference orientation 320, the orientation sensor may measure the change in orientation, i.e., the device rotation 330, and provide the device rotation 330 to the image processor 150 in the form of rotation data 125. The means 140 for establishing the center of rotation may have established the region of interest 380 as the center of rotation 340, e.g., for enabling a user to conveniently obtain views showing the region of interest 380 from various sides. It will be appreciated that, in general, establishing a region of interest as a center of rotation may comprise establishing a center of the region of interest as the center of rotation when the region of interest is a two-dimensional or three-dimensional shape in the image data 300. When the region of interest is a point, i.e., sometimes referred to as a point of interest, the center of rotation may directly coincide with the point of interest.

The image processor 150 may establish a current view 350 in the image data 300 by firstly establishing a view rotation 370 in relation to the device rotation 330, and secondly establishing the current view 350 in dependence on the view rotation 370 around the center of rotation 340 with respect to the reference view 360. The establishing the view rotation 370 in relation to the device rotation 330 may comprise applying a gain to the device rotation 330 to obtain the view rotation 370. For example, the device rotation 330 may be 30 degrees, and the image processor 150 may establish the view rotation 370 by multiplying the device rotation 330 with a factor of two to obtain as the view rotation a rotation of 60 degrees. However, the view rotation 370 may also equal the device rotation 330.

Figure 6:
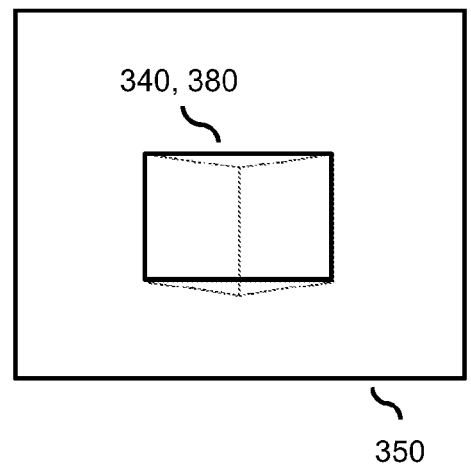
FIG. 6 shows the current view showing the region of interest.

A result of the establishing the current view 350 in dependence on the view rotation 370 around the center of rotation 340 with respect to the reference view 360 is shown in FIG. 4, where the current view 350 is shown to be rotated around the center of rotation 340 by an amount indicated by the view rotation 370 with respect to the reference view 360. FIG. 6 shows a result of the volume rendering, i.e., the current view 350 showing the region of interest 380 from a second side. When comparing the reference view 360 from FIG. 5 with the current view 350 from FIG. 6, it is clear that, as a result of rotating the image device 110, the current view 350 shown on the display 130 shows a second side of the region of interest 380, with the second side being obtained by a rotation around the region of interest 380 with respect to the first side shown in the reference view 360 in FIG. 5.

It will be appreciated that many options exists for said establishing the current view 350 given the view rotation 370, the center of rotation 340 and a reference view 360. In general, a coordinate system may be defined by which the orientation 310 of the image device 110 may be expressed, i.e., a device coordinate system. The device coordinate system may comprise an origin, e.g., one corner of the image device 110, and three coordinate axes, e.g., an x-axis defined along a width of the image device 110, a y-axis defined along a depth of the image device 110, and a z-axis defined along a height of the image device 110. It will be appreciated that any other suitable coordinate system may be used as well, i.e., the choice of origin and rotation axes is not limited to the one presented above. The device coordinate system may be expressed in units of, e.g., millimeters.

The reference orientation 320, e.g., an initial orientation or a previous orientation of the image device 110, may be expressed as a reference device vector in the device coordinate system. The reference orientation may be measured by the orientation sensor 120. For example, an accelerometer or gyroscope may measure a direction of gravity for providing a reference device vector expressing the reference orientation 320 of the image device with respect to a direction or orientation of gravity. The orientation sensor 120 may also provide an origin of the reference device vector in the device coordinate system. The origin of the reference device vector may correspond to a reference position of the image device 110 with respect to the device coordinate system. It is noted, however, that the origin of the reference device vector may not be needed for establishing the reference orientation.

The orientation sensor 120 may provide the orientation 310 of the image device 110 as a current device vector within the device coordinate system. The orientation sensor 120 may also provide an origin of the current device vector in the device coordinate system corresponding to a current position of the image device 110. The orientation sensor 120 may then compare the current device vector with the reference device vector for determining a change in orientation of the image device 110, e.g., a device rotation 330. For that purpose, the orientation sensor 120 may determine a difference between the current device vector and the reference device vector. The orientation sensor 120 may disregard a difference in origin of the current device vector and the reference device vector, as the difference in origin may correspond to a change in position and may not be needed for establishing a change in orientation. However, the orientation sensor 120 may also determine the change in position for providing device translation in addition to device rotation 330.

In addition to a device coordinate system, a coordinate system may be defined by which the orientation of the views in the image data 300 may be expressed, i.e., an image coordinate system. The image coordinate system may define an origin as being one corner of the image data 300 as shown in FIG. 3, i.e., corresponding to a vertex of the outline of the image data 300. The image coordinate system may further define three coordinate axes, e.g., running along the edges of the outline that meet at said vertex. The image coordinate system may be expressed in units of, e.g., millimeters. The image coordinate system may be related to the contents of the image data 300. For example, when the image data 300 is medical image data, the image coordinate system may be defined by a standard for medical image data, i.e., may be a standardized image coordinate system.

An orientation of the reference view 360 in the image coordinate system may be expressed as a reference view vector. The reference view vector may be linked to the reference orientation 320 in the device coordinate system, i.e., the reference device vector. The link between both orientations may comprise a rotation transformation. However, the origin of the device coordinate system and the origin of the image coordinate system may not coincide. Also, the origin of the reference device vector within the device coordinate system and the origin of the reference view vector in the image coordinate system may not coincide. To compensate for such non-coinciding, an additional translation transformation may be needed for linking the reference view vector to the reference device vector. The rotation transformation and the possible additional translation transformation may be established when starting to operate the image processing system 100 or image device 110.

Establishing the current view may comprise the following steps. In a first step, the reference device vector is mapped to the reference view vector using the aforementioned rotation transformation and the possible additional translation transformation. In a second step, the image data 300 is shifted within the image coordinate system such that the center of rotation 340 is located at the origin of the image coordinate system. In a third step, the reference view vector is then rotated around the origin of the image coordinate system in relation to the device rotation, e.g., the difference between the current device vector and the reference device vector, thereby yielding a current view vector. As a result, the current view vector differs in terms of origin and in terms of direction from the reference view vector. In a fourth step, the second step is reversed by shifting back the image data 300 within the image coordinate system. The current view vector may then be used to derive parameters for establishing the current view. For example, when the current view is established using multi-planar reformatting, i.e., slicing of volumetric data, the current view may be generated by generating an image slice through the origin of the current view vector, with a plane running along the image slice being orthogonal to the current view vector.

It will be appreciated, however, that many other techniques may be used for establishing the current view instead or in addition to the above steps, e.g., as are known from the field of general fields of Euclidean geometry and computer graphics and rendering.

Figure 7:
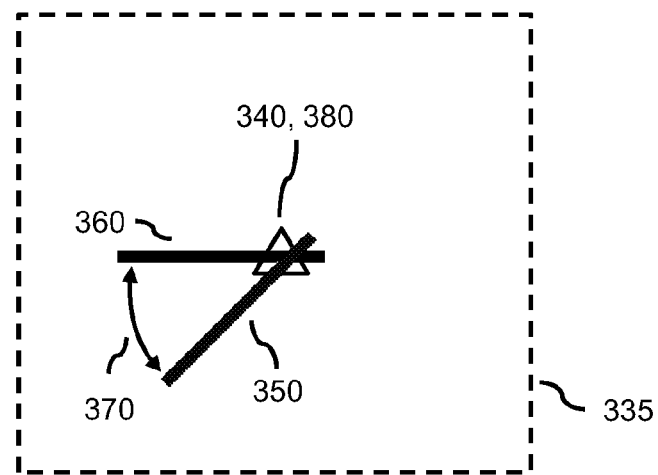
FIG. 7 shows another example of a current view being rotated around a region of interest with respect to a reference view.

FIG. 7 is similar to FIG. 5 in that it shows a result of the current view 350 being established in dependence on the reference view 360, the center of rotation 340 and the view rotation 370. However, in this example, the reference view 360 is generated by multi-planar reformatting of the image data 300, yielding as the reference view 360 a slice through the image data 300. Moreover, the region of interest 380 is located, i.e., is visible, in the reference view 360. The region of interest 380 is again established as the center of rotation. As a result of the establishing the current view 350 in dependence on the view rotation 370 around the center of rotation 340 with respect to the reference view 360, the current view 350 is shown to be rotated around the center of rotation 340 by an amount indicated by the view rotation 370. As such, a different slice though the region of interest 380 and surrounding image data 300 is obtained.

Figure 8:
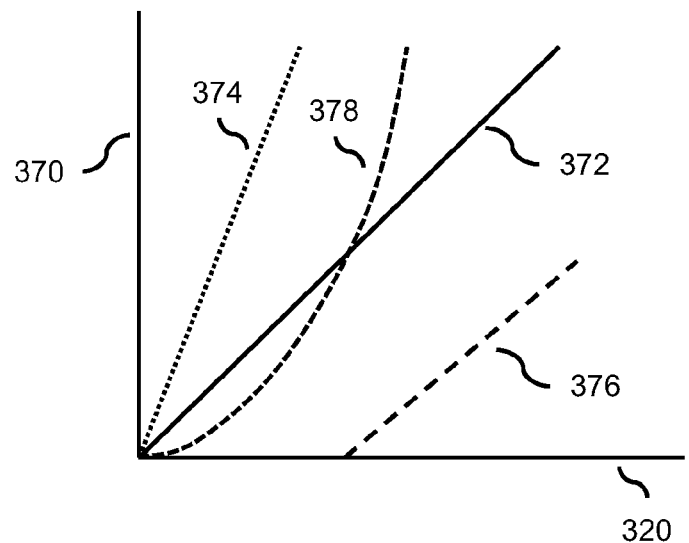
FIG. 8 shows various mappings from device rotation to view rotation.

FIG. 8 shows a graph comprising examples of functions that may be used by the image processor 150 for establishing the view rotation 370 in relation to the device rotation 320. The horizontal axis corresponds to the device rotation 320, and the vertical axis corresponds to the view rotation 370. Both the horizontal axis and vertical axis may show a same or similar range, e.g., from 0 to 90 degrees. The functions 372, 374, 376 and 378 illustrate various mappings from device rotation 320, i.e., an input of the function, to the view rotation 370, i.e., an output of the function. A first function 372 corresponds to a direct mapping, in which a certain amount of device rotation 320 results in a same amount of view rotation 370, e.g., 45 degrees of device rotation 320 results in 45 degrees of view rotation 370. For achieving a greater sensitivity, a second function 374 may be used which corresponds to a gain 374. Thus, a certain amount of device rotation 320 results in a gained or amplified amount of view rotation 370, e.g., 22.5 degrees of device rotation 320 results in 45 degrees of view rotation 370. For reducing a sensitivity to small, possibly unintended device rotations 320, a third function 376 may be used which corresponds to a threshold 376. Thus, the device rotation 320 needs to surpass the threshold 376 in order to achieve a view rotation 370, i.e., one that is not zero. Lastly, a fourth function 378 corresponds to a non-linear function 378 and may be used for obtaining, e.g., a decrease in sensitivity for small, possibly unintended device rotations 320, and an increase in sensitivity for larger device rotations 320. It will be appreciated that any other suitable function may be used as well for establishing the view rotation 370 in relation to the device rotation 320, e.g., by combining aspects of the aforementioned functions.

Figure 9:
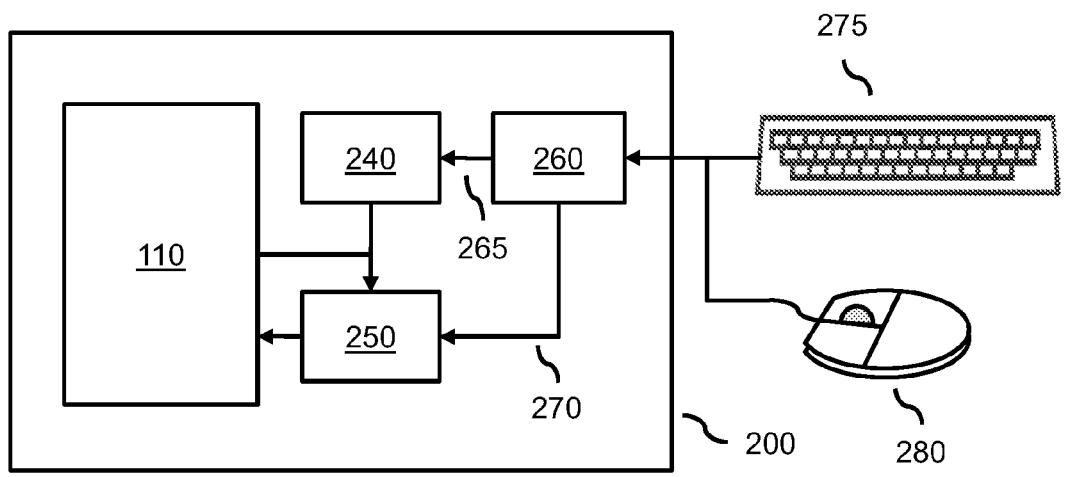
FIG. 9 shows an image processing system comprising a user input.

FIG. 9 shows an image processing system 200 comprising the image device 110 previously shown in FIG. 1. The image processing system 200 further comprises a user input 260 for receiving selection data 265 from the user, and the means 240 for establishing the center of rotation 340 is arranged for establishing the center of rotation in dependence on the selection data. The user may provide the selection data 265 to the user input 260 of the image processing system 200 using any suitable manner, e.g., using a keyboard 275 or a mouse 280. Also, although not shown in FIG. 9, the display 130 of the image device 110 may comprise a touch-sensitive surface for enabling the user to provide the selection data 265 to the user input 260 by means of touching the display 130. The user may provide the selection data 265 to manually select the center of rotation 340, or to modify or influence a manner in which a region of interest detector establishes the center of rotation 340.

The user input 260 may be arranged for receiving navigation data 270 from the user, and the image processor 250 may arranged for establishing the views 155 of the image data 300 in dependence on the navigation data. The user may provide the navigation data 270 to the user input 260 using any suitable manner, e.g., using the aforementioned keyboard 270, mouse 280 or display 130 equipped with a touch-sensitive surface. Thus, the user may use a same manner for providing the navigation data 270 as for providing the selection data 265. However, the user may also use a different manner for said providing. The navigation data 270 may comprise a pan and/or a zoom navigation command, with, e.g., the pan navigation command being provided by the user moving the mouse 280 and the zoom navigation command being provided by the user rotating a wheel of the mouse 280.

The image processing system 200 may be arranged for receiving a reset command from the user for resetting the reference orientation 320 and/or the reference view 360. The image processing system 200 may receive the reset command in any suitable manner, e.g., using the aforementioned keyboard 270, mouse 280 or display 130 equipped with a touch-sensitive surface. The image processing system 200 may also be arranged for receiving a pause command for instructing the image processing system 200 to temporarily suspend establishing the views in dependence on the device rotation. As a result, the image processor 240 may temporarily disregard the device rotation after receiving the pause command, and may resume considering the device rotation after receiving a resume command from the user, with the resume command instructing the image processor 250 to resume establishing the views in dependence on the device rotation.

The means 240 for establishing the center of rotation 340 may be arranged for detecting a region of interest 380 in the image data 300. Thus, said means 240 may comprise, function as, or be a region of interest detector. Said means 240 may also be arranged for establishing the center of rotation 340 in dependence on the region of interest 380. The region of interest detection may employ any suitable technique for detecting a region of interest. For example, when the image processing system 200 is used as a medical image processing system, the region of interest detect may employ any suitable technique as are known from the field of medical image analysis for detecting medical anomalies, e.g., lesions.

In general, the image data may comprises volumetric image data and the image processor may be arranged for said establishing the current view by using at least one of the group of: multi-planar reformatting, volume rendering, and surface rendering, to generate the current view. These techniques are known from the field of volume rendering and image display. The image data may also comprises three-dimensional graphics data and the image processor may be arranged for said establishing the current view by using graphics rendering to generate the current view. Graphics rendering is known from the field of three-dimensional computer graphics. The image data may comprise a combination of volumetric image data and graphics data. Thus, the current view may be established by using at least one of the group of: multi-planar reformatting, volume rendering, and surface rendering, in addition to using graphics rendering to generate the current view.

Establishing the current view may comprise (i) establishing a 4×4 transformation matrix in dependence on the view rotation and the center of rotation, and (ii) generating the current view using the 4×4 transformation matrix. Such 4×4 transformation matrices are widely used in the field of three-dimensional computer graphics for representing projective transformations, including translation, rotation, scaling, shearing, and perspective distortion. In particular, the 4×4 transformation matrix may represent a combination of translation and rotation, thereby allowing the image processor to take into account a center of rotation not coinciding with an origin of the image coordinate system.

The orientation sensor may be a so-termed accelerometer that measures the orientation by comparing an acceleration of a test mass with respect to a free-falling frame of reference. It will be appreciated that the orientation sensor may be any suitable type of accelerometer as are known from the field of accelerometers. The orientation sensor may also be a compass that measures the orientation by comparison with the Earth's magnetic field. Similarly, the orientation sensor may be a gyroscope that measures the orientation by measuring changes in the spin axis orientation of the gyroscope. The orientation sensor may also be a video camera for estimating the ego motion of the image device, i.e., the motion of the video camera and thus of the image device relative to its surroundings, by using video information acquired by the video camera. Techniques for estimating the ego motion using a video camera are known from the field of computer vision, and more specifically, from the field of ego motion estimation. It will be appreciated that such ego motion of the image device enables a change in orientation of the image device to be determined. The orientation sensor may also comprise a combination of, e.g., accelerometer and video camera for improving the accuracy of measuring the orientation of the image device.

The image processing system may be arranged for only considering the device rotation around a single rotation axis. Thus, any device rotation may only be considered with respect to said rotation axis. A reason for this may be to intentionally limit the user in rotating around the region of interest, or due to a limitation of the orientation sensor. The device rotation may also be considered around more than one rotation axis, e.g., an x-axis, y-axis and z-axis, and as such, the device rotation may be decomposed in a number of so-termed principle rotations, e.g., a so-termed yaw, pitch, and roll. A user may thus arbitrarily rotate around the region of interest in the image data.

The image processing system may be a handheld device, i.e., incorporating the display, the orientation sensor, the means for establishing the center of rotation and the image processor. The handheld device may be a tablet device. The image processing system may also be a workstation comprising a display, with a housing of the display comprising the orientation sensor. The housing of the display, i.e., the image device, may be physically rotatable by, e.g., being suitable mounted with respect to a desk or wall.

Figure 10:
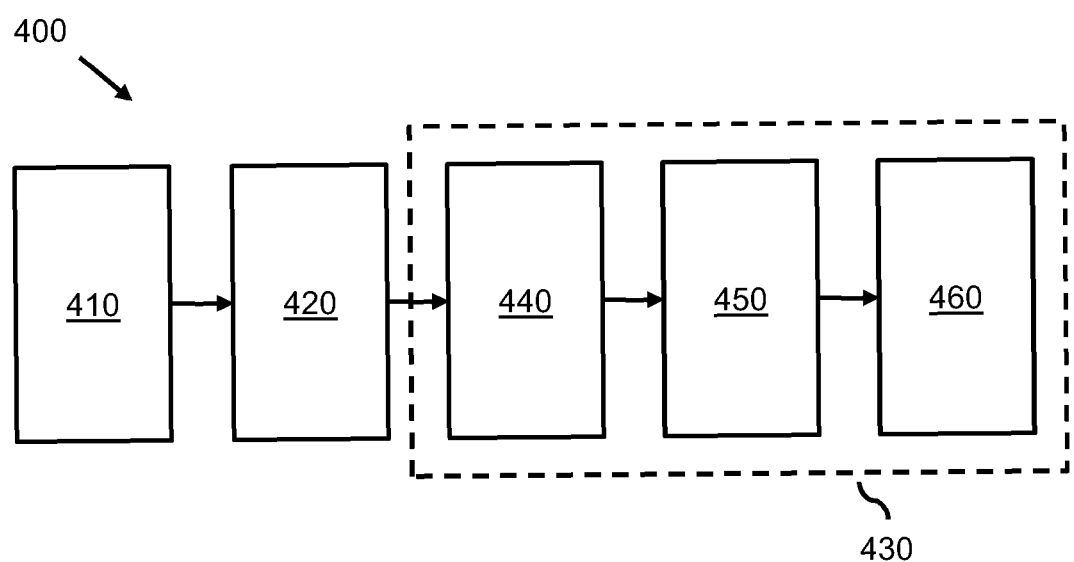
FIG. 10 shows a method according to the present invention.

FIG. 10 shows a method 400 of enabling a user to navigate through image data having at least three spatial dimensions by displaying views of the image data on a display of an image device, the method comprising measuring 410 an orientation of the image device with respect to a reference orientation for providing rotation data indicative of a device rotation of the image device, establishing 420 a center of rotation in the image data, and establishing 430 the views of the image data in relation to the device rotation by, for establishing a current view, (i) receiving 440 the rotation data from the orientation sensor, (ii) establishing 450 a view rotation in relation to the device rotation, and (iii) establishing 460 the current view in dependence on the view rotation around the center of rotation with respect to a reference view.

Figure 11:
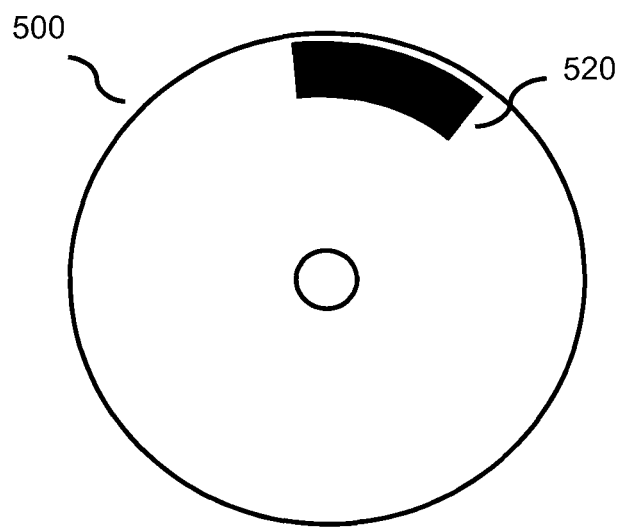
FIG. 11 shows a computer readable medium comprising a computer program product.

FIG. 11 shows a computer readable medium 500 comprising a computer program 520, the computer program 520 comprising instructions for causing a processor system to perform the method 400 as shown in FIG. 10. The computer program 520 may be embodied on the computer readable medium 500 as physical marks or by means of magnetization of the computer readable medium 500. However, any other suitable embodiment is conceivable as well. Furthermore, it will be appreciated that, although the computer readable medium 500 is shown in FIG. 11 as an optical disc, the computer readable medium 500 may be any suitable computer readable medium, such as a hard disk, solid state memory, flash memory, etc., and may be non-recordable or recordable.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java inter-preter instructions). Alternatively, one or more or all of the sub-routines may be stored in at least one external library file and linked with a main program either statically or dynami-cally, e.g. at run-time. The main program contains at least one call to at least one of the sub-routines. The sub-routines may also comprise function calls to each other. An embodi-ment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instruc-tions may be sub-divided into sub-routines and/or stored in one or more files that may be linked statically or dynami-cally.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combi-nation of these measures cannot be used to advantage.

The invention claimed is:

1. An image processing system for enabling a user to navigate through image data having at least three spatial dimensions by displaying views of the image data, the image processing system comprising:
   an image device comprising a display for displaying the views of the image data and an orientation sensor for measuring an orientation of the image device with respect to a reference orientation and for providing rotation data indicative of a device rotation of the image device;
   means for establishing, in the image data, a center of rotation about which the views of the image data from the image device rotate in the device rotation; and
   an image processor for establishing the views of the image data in relation to the device rotation by: (i) receiving the rotation data from the orientation sensor, (ii) establishing a view rotation in relation to the device rotation, and (iii) establishing a current view in depen-dence on the view rotation around the center of rotation with respect to a reference view; wherein:
   the means for establishing the center of rotation comprises a region of interest detector for detecting a medical anomaly as a region of interest in the image data,
   enabling the means for establishing the center of rotation to establish the center of the region of interest as the center of rotation, and
   the region of interest is imagery of a physical object within the image data.

2. The image processing system according to claim 1, wherein:
   the image processing system further comprises a user input for receiving selection data from the user, and
   the means for establishing the center of rotation is arranged for establishing the center of rotation in further dependence on the selection data so as to enable the user to influence a manner in which the center of rotation is established.

3. The image processing system according to claim 2, wherein:
   the user input is arranged for receiving navigation data from the user, and
   the image processor is arranged for establishing the views of the image data in dependence on the navigation data.

4. The image processing system according to claim 3, wherein the navigation data comprises a pan or a zoom navigation command.

5. The image processing system according to claim 1, wherein the image data comprises volumetric image data and the image processor is arranged for said establishing the current view by using at least one of a group of: multi-planar reformatting, volume rendering, and surface rendering, to generate the current view.

6. The image processing system according to claim 1, wherein the image data comprises three-dimensional graph-ics data and the image processor is arranged for said establishing the current view by using graphics rendering to generate the current view.

7. The image processing system according to claim 1, wherein said establishing the current view comprises (i) establishing a 4×4 transformation matrix in dependence on the view rotation and the center of rotation, and (ii) gener-ating the current view using the 4×4 transformation matrix.

8. The image processing system according to claim 1, wherein the image processor is arranged for establishing the view rotation in relation to the device rotation by applying a direct mapping to the device rotation to obtain the view rotation.

9. The image processing system according to claim 1, wherein the image processing system is arranged for receiving a reset command from the user for resetting the reference orientation or the reference view.

10. The image processing system according to claim 1, wherein the image processing system is arranged for receiving a pause command from the user for pausing said establishing the views of the image data in relation to the device rotation.

11. The image processing system of claim 1, wherein the image processor establishes the view rotation in relation to the device rotation by applying a gain to the device rotation to obtain the view rotation.

12. The image processing system of claim 1, wherein the image processor establishes the view rotation in relation to the device rotation by applying an offset to the device rotation to obtain the view rotation.

13. The image processing system of claim 1, wherein the image processor establishes the view rotation in relation to the device rotation by applying a threshold to the device rotation to obtain the view rotation.

14. The image processing system of claim 1, wherein the image processor establishes the view rotation in relation to the device rotation by applying a non-linear function to the device rotation to obtain the view rotation.

15. A handheld device comprising the image processing system of claim 1.

16. A handheld or an imaging apparatus comprising the image processing system of claim 1.

17. A method of enabling a user to navigate through image data having at least three spatial dimensions by displaying views of the image data on a display of an image device, the method comprising:
- measuring, by an orientation sensor, an orientation of the image device with respect to a reference orientation for providing rotation data indicative of a device rotation of the image device;
- establishing, in the image data, a center of rotation about which the views of the image data from the image device rotate in the device rotation; and
- establishing the views of the image data in relation to the device rotation by: (i) receiving the rotation data from the orientation sensor, (ii) establishing a view rotation in relation to the device rotation, and (iii) establishing a current view in dependence on the view rotation around the center of rotation with respect to a reference view, wherein:
- establishing the center of rotation in the image data comprises:
- automatically detecting a medical anomaly as a region of interest in the image data;
  - identifying a center of the region of interest; and
  - establishing the center of the region of interest as the center of rotation, and
- the region of interest is imagery of a physical object within the image data.

18. A non-transitory computer-readable medium executable on a processor of an image processing system, which when executed by the image processing system cause the image processing system to perform the method according to claim 17.

* * * * *